Nov. 20, 1934.  W. PFEIFFER  1,981,190
HEATING APPARATUS
Filed July 13, 1929  3 Sheets—Sheet 1
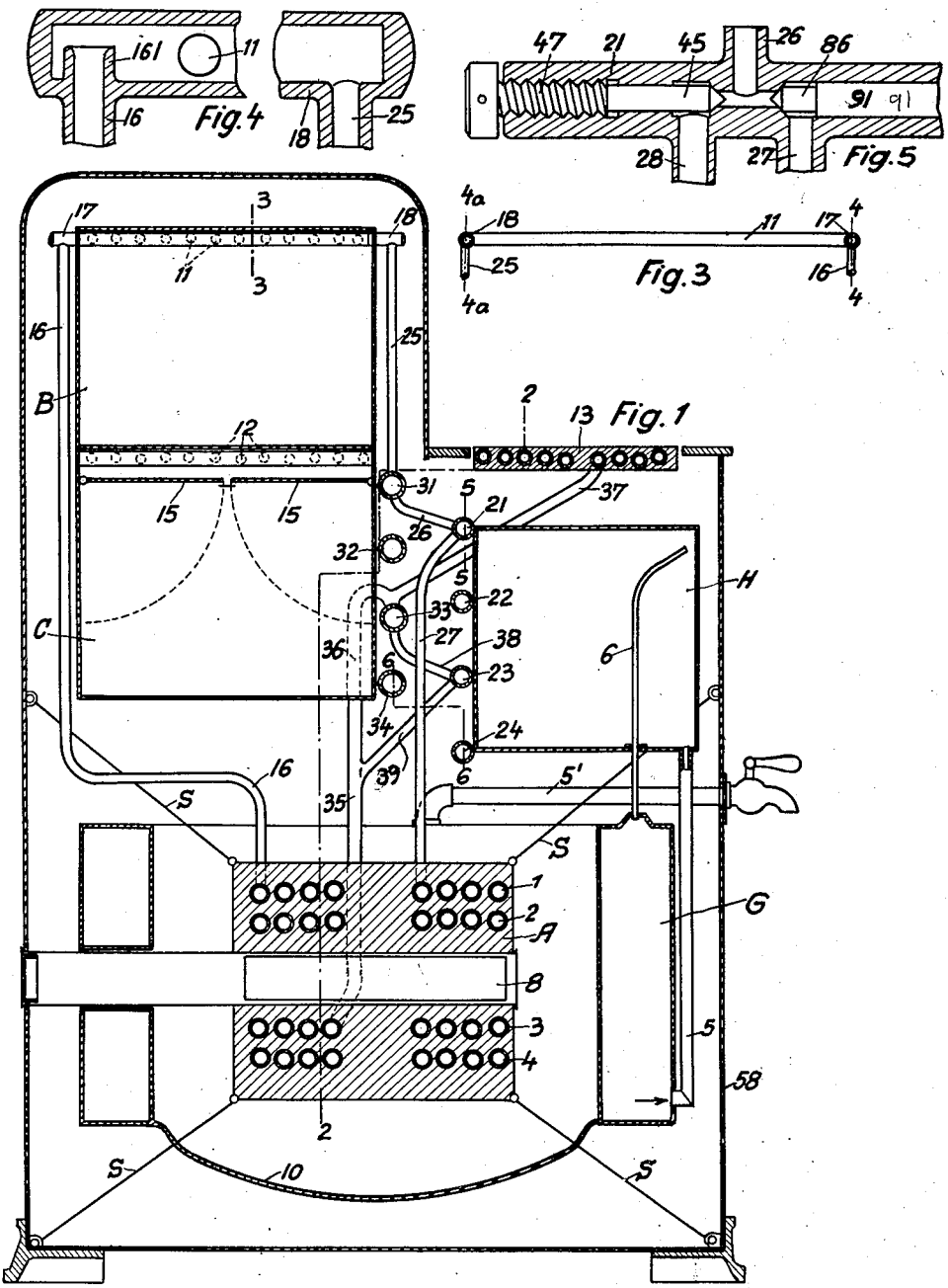
Inventor
Wilhelm Pfeiffer
By Dowell and Dowell
Attorneys Nov. 20, 1934.    W. PFEIFFER    1,981,190
HEATING APPARATUS
Filed July 13, 1929    3 Sheets-Sheet 2
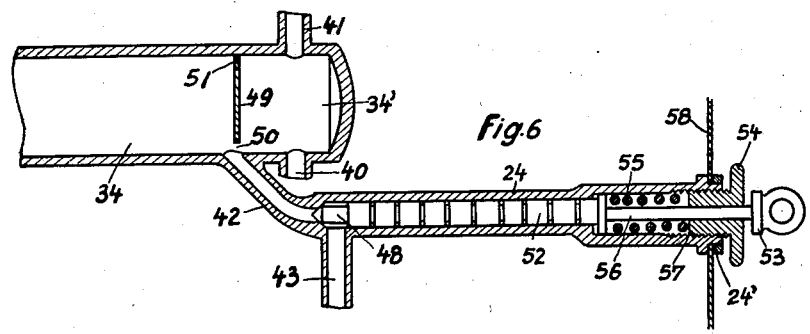
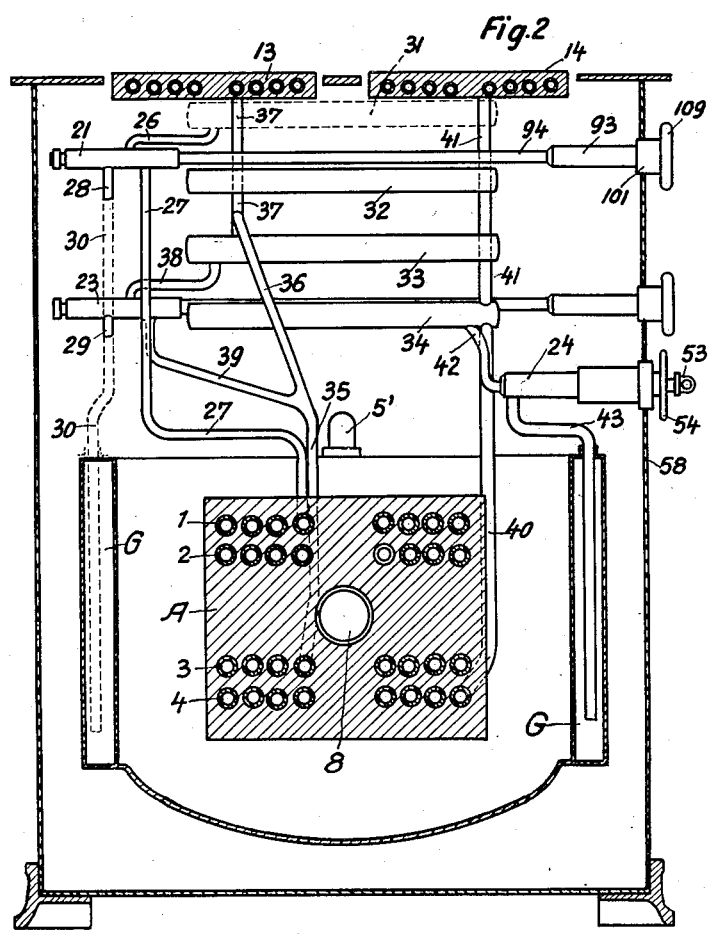
Inventor
Wilhelm Pfeiffer
By Dowell & Dowell
Attorneys Nov. 20, 1934.   W. PFEIFFER   1,981,190
HEATING APPARATUS
Filed July 13, 1929   3 Sheets-Sheet 3
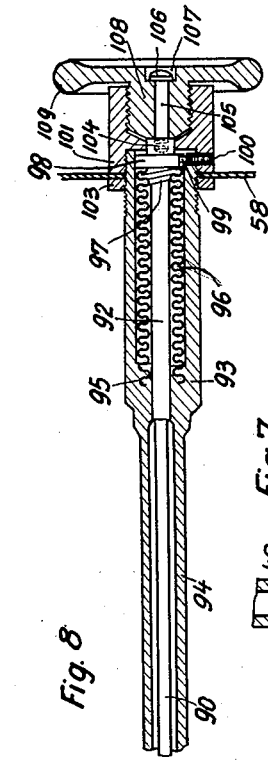
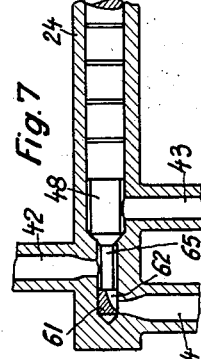
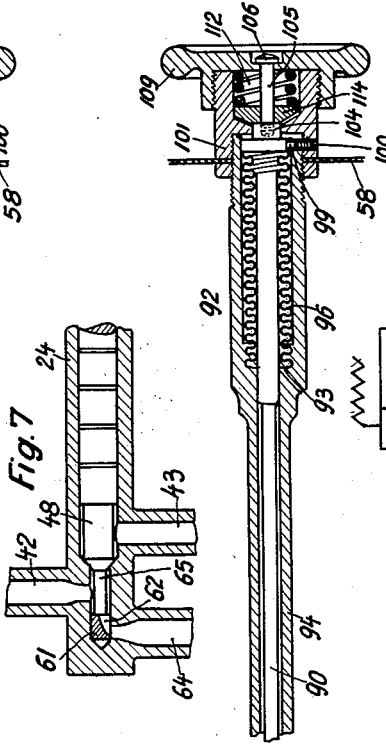
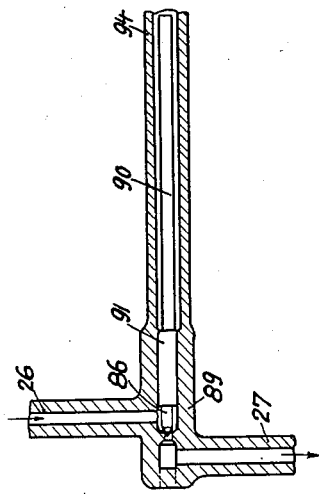
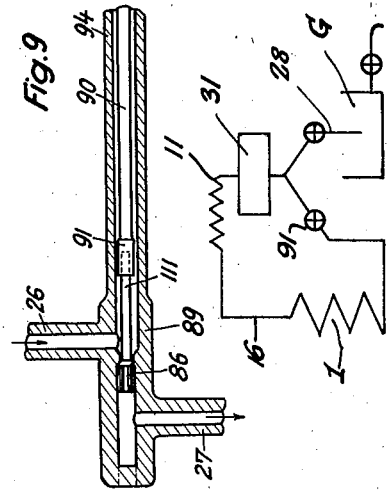
Inventor
Wilhelm Pfeiffer
By Dowell and Dowell
Attorneys Patented Nov. 20, 1934

1,981,190

UNITED STATES PATENT OFFICE 1,981,190

HEATING APPARATUS

Wilhelm Pfeiffer, Kaaden-on-the-Eger, Czechoslovakia, assignor of one-third to Kurt Reiss, Saaz-on-the-Eger, Czechoslovakia Application July 13, 1929, Serial No. 378,154
In Germany April 18, 1929

15 Claims. (Cl. 237—67)

My invention relates to heating systems or apparatus comprising a heat accumulator from which heat is conveyed to a heating unit, or units, through the medium of a circulating liquid in a closed system which connects the unit or units with the accumulator. It is an object of my invention to so design an apparatus of this type that the temperature and the pressure in the same can be varied as desired.

To this end I provide means such as conduits and valves for supplying liquid to, and for tapping liquid from, the system and for regulating the amounts of liquid thus supplied and tapped.

In a preferred embodiment of my invention, I provide a tank which is heated by the heat from the accumulator. The liquid which is supplied to the apparatus is taken from the tank, and the liquid which is tapped from the apparatus, is returned to the tank. However, I am not limited to a tank combined with the apparatus but may supply make-up liquid from any other source, for instance, a metering tank.

Closed systems of the general type referred to have already been proposed but not in combination with my means for varying the amount of the heat transmitting agent in the system.

It is another object of my invention to control the operation of the apparatus and to this end I provide means for regulating the connection of the accumulator with the heating unit or units.

It is still another object of my invention to increase the thermal efficiency of the apparatus, and to this end I provide heat-exchanging means for heating the liquid in the apparatus by the heat of the liquid which is discharged therefrom.

In the accompanying drawings I have illustrated by way of example a cooking range embodying my invention, and various details, but it will be understood that I am not limited to cooking ranges nor to any other specific type of heater in the adaptation of my invention.

In the drawings:

Fig. 1 illustrates a sectional elevation of a complete range embodying the invention.

Fig. 2 is a section on the line 2—2 of Fig. 1,

Fig. 3 is a section on the line 3—3 of Fig. 1,

Fig. 4 at the left is a section on the line 4—4, and at the right is a section on the line 4a—4a of Fig. 3, on a larger scale, Figs. 5 and 6 are sections respectively on the lines 5—5 and 6—6 of Fig. 1, also on a larger scale, Fig. 7 illustrates a modification of the detail shown in Fig. 6, Figs. 8 and 9 are axial sections of two types of regulating valves, and Figures 10 and 11 are schematic views illustrating fluid conduit systems used.

Referring now to the drawings, and first to Figs. 1 and 2, 58 is a casing which may be of sheet metal; A is a heat accumulator which is suspended in the casing 58 by rods or wires S; 1, 2, 3, and 4 are evaporator coils in the body of the accumulator which may be insulated by kieselguhr; G is an annular hot-water tank surrounding the accumulator A and supplied as by piping from a source (not shown); 8 is a preferably electric heater in the accumulator A, and 10 is a bottom plate or reflector extending across the inner open space of the tank G so as to project the heat rays upwards from the accumulator A.

B, C is a casing arranged above the accumulator which in its lower part forms baking or a cooking oven, and in its upper part forms a heating oven; H is an auxiliary tank which is connected with the tank G by a pipe 5, and 6 is a small vent pipe extending upwardly into the auxiliary tank H from the main tank G. 5' is a pipe with a cock or other valve through which liquid is discharged from the main tank G. I will assume that the liquid is water but any other liquid may be used.

13 and 14 are cooking plates or grids arranged above the auxiliary tank H and 11 and 12 are heating pipes for the compartments B and C in the casing, respectively. Each evaporator coil in the accumulator A is connected with a heating system or circuit of its own, thus, the cooking plate 13 is shown connected with the coil 3 by a pipe 35, 36, 37, the system including a condensate cylinder 33, a regulating and make-up valve 23, and pipes 38, 39. The system of the cooking plate 14 is shown to include a pipe 40, 41, a valve 24, a condensate cylinder 34, and pipes 42 and 43. The system of the grid 11 at the top of the compartment B in like manner includes the coil 1, an outflow pipe 16, headers 17 and 18 which are connected by the pipes 11, a return pipe 25, a condensate cylinder 31, a pipe 26, a valve 21, and a pipe 27. The system for the lower grid 12 at the top of compartment B is similar and therefore has not been shown in full detail. It includes the coil 2, the condensate pipe 32, and the valve 22 in corresponding connection.

It will appear that the arrangement of parts illustrated is very favorable as to heat distribution. The heat radiated from the accumulator A in downward direction is deflected by the bottom plate 10 toward the walls of the main tank G in upwardly inclined direction, while the heat radiated upwards from the accumulator A is absorbed by the lower compartment C and the auxiliary tank H. Any heat radiated from the valves 21 to 24 is absorbed by the auxiliary tank H, and any heat radiated from the condensate pipes 31 to 34 is absorbed by the compartments B and C. Heat radiated downwardly from the cooking plates 13, 14 will tend to heat the water in the auxiliary tank H.

The grid 12 supplies heat at the top of compartment C which therefore is very suitable as a cooking oven. 15 are flaps at the bottom of the compartment B which when the grid 12 is intended to supply heat from below to the compartment B, and the compartment C is not required, are closed as shown in Fig. 1. When not in use, the flaps are turned down as indicated by the dotted lines. This arrangement also provides an emergency use in case of trouble. Should the grid 11 fail, the lower compartment may still be operated with heat at its top from the grid 12 while the grid 11 is being repaired. Conversely, if the grid 12 should break down, only the heat from below would be missing in the compartment B, but this would not be serious as with baking and cooking the heat from above is the more important and the heat from below may be dispensed with.

Nor should it be serious if one of the cooking plates 13, 14 should fail as these serve more especially for starting the cooking while the food is finished by preference in the insulated compartments B, C.

The preparation of the food may be speeded up by adding thereto water from the main tank G which is held at 50 to 70 degrees centigrade. Such water may be tapped therefrom through the pipe 5'.

The pipe 5 which connects the main and auxiliary tanks is arranged outside the main tank and is taken down to its bottom to prevent mixing of hot and cold water, and heat transfer by convection. The small vent pipe 6 prevents overflowing of the auxiliary tank H when steam begins generating in the tank G. The vent pipe extends above the liquid level in the auxiliary tank H, and heated air is free to escape while steam is condensed in the vent pipe. The vent also permits tapping at the pipe 5' which in the average system is not feasible as a cold-water pipe must be put on when it is desired to tap the hot-water tank.

Referring now to Fig. 4, the heated liquid in the coil 1 is evaporated and rises as steam in the pipe 16. The opening of the pipe 16 in the header 17 is preferably provided with a projecting flange 161. The steam is now distributed through the pipes 11 of the grid and therewithin condensed, whereupon it flows to the header 18 from which the condensate flows to the condensate pipe 31 through pipe 25, thence to valve 21 through pipe 26, and is finally returned to the coil 1 for re-evaporation through pipe 27. Similarly, the grid 12 is heated from the coil 2 with the liquid passing the condensate pipe 32 and valve 22.

The pipe 35 extending upwards from the coil 3 is forked, one branch 36 being directly connected to the condensate pipe 33, and the other branch 39 being connected to the valve 23 from which the pipe 38 extends to the condensate pipe 33. A pipe 37 connects the condensate pipe 33 with the cooking plate 13. Here, the pipes 36 and 37 are combined steam and condensate pipes but there is no difficulty about this if the pipes are large enough. The cooking plate 14 is operated similarly in connection with the valve 24 and the condensate pipe 34 (see Fig. 2).

Means for making up the liquid in the system will now be described. Such means not only serve for regulating the temperature and the pressure in the apparatus but also for making up inevitable leakage. Even though the system may be perfectly tight initially, some leakage will occur in time as the welding and soldering seams at various points crack on account of the frequent and quick variations in temperature. In a closed system, it is not only difficult to charge it with the exact quantity of liquid required, but in order to make up the liquid, the system must be opened somehow by breaking some of its parts and expensive repairs are required in connection with this.

I overcome this drawback and provide regulating means for the purpose specified by providing make-up valves through which liquid may be supplied to the system from the outside, or may be discharged from the system, as desired. In this manner, I am able to make up for the loss of liquid as often as required, or to regulate the pressure and temperature conditions, or to utilize the discharged liquid for heating purposes. Such valves also permit any part of the system or heating units to be cut off.

The make-up valves may advantageously be combined with the regulating valves 21 to 24, and this will now be described for the valves 21 and 24. Referring first to Fig. 5, 86 is the valve body of the valve 21 which controls the connection of the pipes 26 and 27 and is controlled by a handle 109 (see Fig. 2) which projects from the casing and is later described more in detail with reference to Figs. 8 and 9. 28 is a pipe extending from the valve 21 beyond the seat of the valve 86 and connected with a pipe 30 which extends into the main tank G as shown in Fig. 2. This pipe (30) is preferably connected with all the other valves 22, 23 and 24 as well, but for the sake of simplicity of illustration the only other such connection shown is that with the valve 23 indicated by the broken off pipe 29 (see Fig. 2). The opening of this pipe 28 (or 29) is controlled by a valve 45 having a threaded spindle 47 which is adapted to admit through the pipe 28 (or 29) liquid from tank G or from any other source of supply, not shown. If distilled water or other liquids are used, they may of course be supplied from a separate tank (not shown) under control of this valve 45 as required. If the make-up liquid is stored in a tank, it may be measured out exactly according to requirements.

The valve shown is particularly suitable for a system in which as in the upper grid or plate 11, the liquid is partly in the grid and partly in the condensate pipe when the apparatus is shut down. Preferably, the make-up liquid is supplied cold when the heating unit is cold, and it is readily drawn into the system by the force of the vacuum or suction which is generated therein as the system cools after "shutting off." This vacuum or suction generation results from the vapor or steam action in circulation through the system. When the system or circuit is cutoff after an operation, the heated liquid therein is caused to be blown and drained out of the heating unit or grid by the pressure of its vapor or steam which prevails in the same for a time thereafter. This blowing and draining continues until the circuit is filled only with the vapor or steam at atmospheric pressure. If the filling valve is then closed and the circuit allowed to cool to a heat equalization with the surrounding air, the vapor or steam remaining therein will condense and create a vacuum in its upper part. This vacuum is strong enough to draw filling liquid from the connected source when the filling valve is opened for the purpose before the system is again put in operation. On the other hand, when the liquid is discharged in order to utilize its residual heat, this is preferably effected under the steam pressure in the apparatus.

One of the cooking grids or plates may have no liquid present in its system when it is shut down, the same being admitted through the valve only when the plate is started. An example of this is illustrated by Fig. 6 wherein the valve 24 for the plate 14 is shown without a make-up valve. In said figure, 34 is the condensate pipe. The pipes are preferably of seamless steel and somewhat shorter than the depth of the compartment B, C. 42 is a pipe connecting the valve 24 with the condensate pipe 34, and 43 is a pipe connecting it with the main tank G. 48 is a valve controlling the connection of 42 and 43. 52 is a labyrinth packing on the spindle of the valve 48; 56 is a reduced extension at the outer end of the spindle; 55 is a spring inserted between a shoulder on the spindle and a plug 54 which is threaded into the end of the valve casing through the medium of a threaded sleeve 57; 53 is a handle at the end of the extension 56; and 24' is a ring by which the valve casing is secured in the sheet metal casing 58 of the range. The pressure of the spring 55 is regulated by turning the plug 54.

It will be understood that this valve is not only a shut-off but also a pressure regulating valve as the pressure and the temperature at the plate 14 are functions of the pressure exerted on the liquid by the spring.

49 is a baffle in the condensate pipe 34 which extends almost to its bottom, leaving a gap at 50 and subdividing the pipe into a compartment 34' which is connected with the plate 14 by the pipe 41 and with the coil 4 of the accumulator A by the pipe 40. 51 is a perforation near the upper end of baffle 49. When the valve 48 is opened by pulling out the handle 53, water from the main tank G flows into the condensate pipe under the vacuum in the pipe, but the baffle 49 by its injector-like action on the gap 50 prevents the water from flowing to the pipe 40 and back to the coil 4. When enough liquid is in the condensate pipe 34 the handle 53 is released and the spring 55 closes the valve. Liquid now flows to the coil 4, steam is developed and flows to the plate 14 through pipe 41. The condensate from the plate 14 returns through 41 and 40 which, as mentioned, does not involve any difficulty if the pipes are large enough. When the valve 48 opens, steam and liquid, if any, flow to the main tank G through 43 and heat the water in the tank. The pressure of the spring 55 regulates the quantity of liquid which remains in the system, and consequently the pressure and the temperature. If distilled water or some other special liquid is employed, the pipe 43, or a collector for all systems may be closed and passed through the tank G to give off the heat of its liquid to the liquid in the tank G, and then passed to the special tank, not shown. The special tank used in such case would preferably be provided with means for readily recharging it, and with a float or other means for indicating the liquid level therein. In this manner the quantity of liquid supplied to each system may be brought under exact control and this is desirable for rapid and proper operation of valve 48.

It will be understood that each of the heating circuits includes a filler or "make-up" valve, but that this valve may be constructed in different ways. For instance, it may be made according to the aforedescribed Fig. 5, wherein the valve body 45 is intended to admit or discharge heating liquid while the valve body 86 serves to regulate the heating supply and efficiency, or it may be made instead according to the above-described Fig. 6 wherein the valve body 48 merely controls the entrance or discharge of the heating liquid and is operable manually or automatically when a predetermined pressure is exceeded. In this last mentioned embodiment, there is no special regulating valve corresponding to the member 86 in Fig. 5. The heating efficiency is regulated by allowing more or less heating liquid to pass the valve body 48 into the heating circuit. Thus, alternative constructions are provided, either of which may be used, although it is preferable ordinarily to build the apparatus only with one or the other type of valve. In order not to encumber the disclosure with too many illustrations, Fig. 2, which represents the same heating apparatus as Fig. 1, shows both types of these valves in order to make their alternative application clear, viz., a valve 24 of the type illustrated in Fig. 6 and valves 21, 22 and 23 of the type illustrated in Fig. 5. As before stated however, it is more practical to build the apparatus with all the valves of the one or the other type.

Fig. 7 shows the last described valve of Fig. 6 in combination with a make-up valve 61. The latter comprises a rotary valve which is connected with the valve 48 by a rod 65 and recessed at 62. 64 is a make-up pipe. In the position illustrated the handle 53 has been turned so as to bring the recess 62 into its lower position in which it connects the make-up pipe 64 with the pipe 42. When the handle is turned so as to move the recess upwards the connection is broken and no make-up liquid is supplied.

Figs. 8 and 9 show regulating valves which may be combined with the make-up valve 45 or 61, as desired. The conditions under which such regulating valves are operated, are rather exacting. They are subjected to pressures of about 200 kilogrammes per square centimetre, and to temperatures up to 450 degrees centigrade, and are supposed to hold absolutely tight for many years. Therefore, the usual springs for holding down the valves are not suitable here and have been replaced by cylindrical diaphragms or helical pipes which are soldered to the valves. In view of the high temperatures only brazing has heretofore been practicable but the high temperature at which this is performed reduces the strength of the diaphragm or the like, so that its life is reduced, the more so as the stress on the diaphragm under the operation of the valve is heavy. Brazed parts are difficult to exchange.

According to my invention however, the diaphragm or the like is removed out of the zone of high temperature and therefore may be soft-soldered. Motion is transmitted to the valve body by a long rod of small cross section so that heat transfer is reduced. Under these conditions soft soldering is practicable. In order to prevent access of superheated steam to the solder, care is taken to keep the tube in which the rod is carried filled with liquid. A suitable diaphragm is a so-called seamless axially resilient tube of copper alloy, phosphor bronze, aluminium, or the like. Such a tube will stand 300 to 400 kilogrammes per square centimetre inner pressure with an inner diameter of about 6 millimetres if held against lateral movement. Such movement is prevented by placing the tube on a pin which is preferably ground bright to prevent abrasion of the tube.

Referring now to Fig. 8, 89 is a valve casing (corresponding with the casing 21 of Figs. 2 and 5) for the valve 86 which connects the pipes 26 and 27, as described with reference to Fig. 5. The valve 86 is provided with a piston 91 which makes a sliding fit in the casing 89 (or 21) a rod 90, and a piston 92 at the other end of the rod. This piston slides in a casing 93, and 94 is a long pipe connecting the casings 89 (or 21) and 93 as shown in Fig. 2. The casing 93 is threaded at its inner end at 95 and a seamless helical tube 96 is inserted in the threads, and soldered to them. The other end of the tube is secured to a thread 97 at the end of the piston 92, and also soldered. 98 is a flange at the outer end of the piston which makes a tight fit in the casing 93; 101 is a threaded sleeve seated on a thread on the casing 93; 103 is a nut holding the sleeve in contact with the wall 58; 99 is a groove in the flange 98; 100 is a pin inserted in threaded holes of 93 and 101; 104 is a boss on the outer face of the flange 98; 105 is a pin seated in a threaded hole in the boss; 109 is a hand wheel the boss 108 of which is threaded into the sleeve 101; 107 is a recess in the outer face of the hand wheel and 106 is a head at the outer end of the pin 105 which is inserted in the recess 107.

It will be understood that by turning the hand wheel the valve 86 will be displaced axially as its spindle is prevented from turning by the pin 100.

The points where the tube 96 is soldered to the casing and the piston, are situated in comparatively cool zones so that the solder will not melt.

Referring now to Fig. 9 this valve is equipped with automatic regulating means. The position of the valve 86 with respect to its seat in the casing 89 has been reversed as compared with Fig. 8 so that the pressure in the system tends to seat the valve. The valve 86 is connected with the piston 91 by a rod 111. 112 is a spring inserted in the hand wheel 109 which reacts against the hand wheel at one end and a plate 114 on the valve spindle at the other. The spring tends to open the valve and its pressure may be regulated. When the steam pressure acting on the piston 91 exceeds the pressure of the spring the valve 86 is closed.

I claim:

1. A heating device, comprising in combination, a heat accumulator, means for heating the accumulator, a heat-exchanging grid, a closed fluid circuit connecting the grid with the accumulator, means for varying the amount of fluid in the circuit and means associated with said varying means for interrupting the flow of fluid in the circuit; said two last-named means respectively comprising a source of liquid supply and a valve interposed in said circuit and connected with said supply source, having adjustable members separately controlling the circuit and the supply source connection therewith.

2. In a heater comprising a heat accumulator, means for heating said accumulator, a heating grid, and a closed liquid system connecting said grid and said accumulator, the combination of a valve in said system for interrupting the flow of liquid therein, and a diaphragm associated with said valve for exerting pressure thereon maintaining it in set position; said diaphragm being arranged beyond the region of high temperature of the valve.

3. In a heater comprising a heat accumulator, means for heating said accumulator, a heating grid, and a closed liquid system connecting said grid with said accumulator, the combination of an adjustable valve connected in the system for interrupting the flow of liquid therein, and a longitudinally resilient metal tube on the stem of said valve beyond the high-temperature region thereof adapted to exert pressure thereon in one direction while permitting it to turn in opposite directions.

4. In a heating device including a heat accumulator, means for heating the accumulator, a heat-exchanging grid, and a fluid circulation system connecting said grid with said accumulator, the combination of a valve applied in the system for controlling the flow of the fluid therein and having a spring-element acting thereon in an axial direction; said valve being arranged so that the fluid pressure within the system tends to move it to one operating position while said spring thereon tends to move it to another operating position.

5. In a heater embodying a heat accumulator, means for heating the accumulator, a heating grid and a closed liquid circulating system connecting the grid with the accumulator, the combination of a rotary valve in the system for regulating the flow therein, an axially displaceable valve controlling the supply of liquid to and the discharge thereof from the system, and a spindle connecting the two valves and adapted to rotate the first and to slidably displace the second.

6. A heating apparatus, comprising a heater unit, a heat accumulator, means for heating the accumulator, a liquid circuit between said accumulator and said unit, a connection between said circuit and a source of liquid supply, a valve casing interposed in said circuit at the point of juncture of said liquid supply connection therewith, a valve in said casing controlling the supply of liquid through the liquid supply connection, and a valve in said casing controlling liquid flow through said circuit; said two controlling valves being independently operable by common actuating means.

7. In a heater embodying a heat accumulator, means for heating the same, a heating grid and a closed liquid circuit connecting the grid with the accumulator; the combination of means connected with a liquid supply source and with said circuit for supplying liquid to or discharging it from the circuit, comprising a valve member interposed in said circuit at the point of connection of said supply and discharge means therewith and having adjustable closures for controlling the passage of liquid through the circuit and through the connection with the supply source.

8. In a heater embodying a heat accumulator, means for heating the same, a heating grid and a closed liquid circuit connecting the grid with the accumulator; the combination of means connected with a supply source and with said circuit for supplying liquid to or discharging it from the circuit, comprising a valve casing interposed in said circuit and having a valve-member therein operable by exterior adjustment means for controlling the passage of liquid through the circuit and another valve-member therein also operable by exterior adjustment means for controlling the connection with the supply source.

9. In a heater embodying a heat accumulator, means for heating the same, a heating grid and a closed liquid circuit connecting the grid with the accumulator, the combination of means for supplying liquid to or discharging it from the circuit; said means comprising a valve-casing interposed in said circuit and connected with a liquid supply source, a valve-member in said casing adapted to close the circuit passage therethrough and adjustable by exterior operating means for controlling said passage, and another valve-member in said casing adapted to close its connection with the supply source and also adjustable by exterior operating means for controlling said connection.

10. A heater according to claim 9, wherein the liquid circuit includes a condensate reservoir, which reservoir and the valve casing are both utilized as heat exchanging means.

11. A heater according to claim 9, wherein the connection with source of liquid supply serves both to supply the circuit and to receive discharge therefrom by vacuum and steam pressure actions respectively.

12. In a heater embodying a heat accumulator, means for heating the accumulator, a heating grid, and a closed liquid system connecting the grid with the accumulator, the combination of a valve-member connected in the system for interrupting the flow of liquid therein; said member embodying a valve head having a stem encased within a tube inserted in the line of the system, pressure actuated means on the stem tending to move said valve to closed position under influence of pressure in the system; a spring-like element on the stem of the valve beyond the high-temperature zone thereof and adapted to exert pressure on the valve, a hand-wheel connected with the stem for displacing the same without rotating it, and a spring inserted between the hand-wheel and valve stem arranged to exert a force tending to open said valve and cooperating with said pressure actuated means for adjusting the valve to active position at a given pressure independently of the hand-wheel.

13. A heating device, comprising in combination, a heat accumulator, means for heating the accumulator, a heat-exchanger grid, a closed fluid circuit connecting said grid with said accumulator, a condensate reservoir connected in the circuit, a source of liquid supply and means for either admitting the supply of liquid from said source to the circuit or discharging the same therefrom according to requirements; said means comprising a connection between the source and said reservoir, and a valve interposed in both the last-named connection and in the circuit, having one member controlling the former and another member controlling the fluid passage through the latter.

14. A heating device, comprising in combination, a heat accumulator, means for heating the accumulator, a heat-exchanging grid, a closed fluid circuit connecting said grid with said accumulator, a condensate reservoir in said circuit, means for varying the amount of fluid in the circuit and means associated therewith for interrupting the flow of the fluid in the circuit; said two last named means including a source of liquid supply connecting with said reservoir and a hand-control valve interposed in the connection therebetween, said valve being also self-adjustable to opening and closing positions by opposed fluid pressure and spring forces therewithin.

15. In a heating apparatus, a heat accumulator with means for heating the same, a heating grid, a closed liquid circuit connecting the grid with the accumulator, a connection between said circuit and a source of liquid supply, and means for controlling the supply of liquid to and the circulation thereof in said circuit; said means comprising a valve casing interposed in said circuit at the point of its connection with said connection from the supply source, and a pair of valve members therein independently closing connecting passages therethrough on the same axial line.

WILHELM PFEIFFER.